US006800847B2

(12) United States Patent
Axelsson

(10) Patent No.: US 6,800,847 B2
(45) Date of Patent: Oct. 5, 2004

(54) FAST VARIABLE GAIN DETECTOR SYSTEM AND METHOD OF CONTROLLING THE SAME

(75) Inventor: Jan Axelsson, Storvreta (SE)

(73) Assignee: Amersham Biosciences AB, Uppsala (SE)

( * ) Notice: Subject to any disclaimer, the term of this patent is extended or adjusted under 35 U.S.C. 154(b) by 0 days.

(21) Appl. No.: 10/476,908

(22) PCT Filed: May 3, 2002

(86) PCT No.: PCT/EP02/04886

§ 371 (c)(1), (2), (4) Date: Mar. 24, 2004

(87) PCT Pub. No.: WO02/091425

PCT Pub. Date: Nov. 14, 2002

(65) Prior Publication Data

US 2004/0155187 A1 Aug. 12, 2004

(30) Foreign Application Priority Data

May 4, 2001 (SE) ............................................. 0101555

(51) Int. Cl.$^{7}$ ........................... B01D 59/44; H01J 49/00
(52) U.S. Cl. ........................................ 250/281; 250/283
(58) Field of Search .................................. 250/281, 283

(56) References Cited

U.S. PATENT DOCUMENTS

| | | | | |
|---|---|---|---|---|
| 4,977,320 A | * 12/1990 | Chowdhury et al. | ........ | 250/288 |
| 5,591,969 A | * 1/1997 | Park et al. | .................. | 250/287 |
| 2002/0182649 A1 | * 12/2002 | Weinberger et al. | ......... | 435/7.9 |
| 2002/0195555 A1 | * 12/2002 | Weinberger et al. | ........ | 250/281 |
| 2003/0219731 A1 | * 11/2003 | Weinberger et al. | ........... | 435/5 |
| 2004/0079878 A1 | * 4/2004 | Vestal et al. | ................ | 250/287 |

OTHER PUBLICATIONS

Nielsen, "Biomolecular ions in accelerators and storage rings," Journal of Physics B: Atomic, Molecular and Optical Physics, Apr. 2004, pp. R–26–R56.*
Westman, A., et al. "MALDI induced saturation effects in chevron microchannel plate detectors" International Hournal of Mass Spectrometry and Ion Processes, Elsevier Scientific Publishing Co., Amsterdam, NL vol. 169–170, Dec. 1, 1997 pp. 79–87.
Patent Abstracts of Japan vol. 2000, No. 01, Jan. 31, 2000 & JP 11 288684 A, Oct. 19, 1999.

* cited by examiner

*Primary Examiner*—David E. Graybill
(74) *Attorney, Agent, or Firm*—Royal N. Ronning, Jr.; Stephen G. Ryan; Yonggang Ji

(57) ABSTRACT

A micro-channel plate (MCP) detector system (30) comprising a MCP detector, a data acquisition unit (20), wherein the detector comprises a first and a second MCP electron multiplier (12, 14), one or more anodes (16) connected to the data acquisition unit (20) and a gate electrode (32) disposed between the first and the second MCP electron multiplier (12, 14), wherein the detector system further comprises a data storage unit (36) and a gain control unit (34) which is connected to the gate electrode (32) and to the data storage unit (36), wherein a pilot spectrum is stored in the data storage unit (36), and wherein the gain control unit (34) is arranged to read the pilot spectrum from the data storage unit (36), and to control the potential on the gate electrode (32) as a function of m/z or time in response to said pilot spectrum, such that the transmission of electrons to the second MCP electron multiplier (14) is lowered when abundant protein ions appear, whereby a high sensitivity is maintained during the remainder of the measurement cycle such that neighboring peaks from rare protein ions become detectable.

6 Claims, 4 Drawing Sheets

FAST VARIABLE GAIN DETECTOR SYSTEM AND METHOD OF CONTROLLING THE SAME

CROSS-REFERENCE TO RELATED APPLICATION

This application is a filing under 35 U.S.C. §371 and claims priority to international patent application number PCT/EP02/04886 filed May 3, 2002, published on Nov. 14, 2002 as WO02/091425, and to foreign application number 0101555.1 filed in Sweden on May 4, 2001, the entire disclosures of which are hereby incorporated by reference.

FIELD OF THE INVENTION

The present invention relates to a micro-channel plate (MCP) detector system, a modified fast gain MCP-detector and a method of operating the same. More specifically, the invention relates to a micro-channel plate detector system with fast variable gain and a method of operating the same, such that an improved dynamic range is achieved.

PRIOR ART

Analyzing all proteins from cells is impossible by today's techniques since the amount of each expressed protein varies over a huge dynamic range. Mass spectrometry, together with other techniques, has shown a lack of the necessary dynamic range, largely due to lack of a detection technique that can detect both the abundant and the very rare proteins within the same mixture. Noteworthy is, that also a separated (LC, gel, etc) sample will display mixtures with overlapping protein species, so the problem with complex mixtures remains also after separation. An ideal mass spectrometer should therefore have single particle sensitivity and a high dynamic range. FIG. 3*a* shows a fabricated example of a mass spectrometer spectrum, wherein these large variations in amount of each expressed protein are illustrated.

In this document ionization efficiency and transmission from ion source to detector will not be discussed. Designing a mass spectrometric detection is a trade off. Today, a perfect system can only be designed to one of the two extremes: either tailoring the detection for single-ion detection or for high dynamic range. The extreme sensitivity can be achieved by using a high detector gain and digital single-particle pulse counting electronics. High dynamic range can be achieved by using lower gain and analog detection electronics. The problem is that, ideally, both the high sensitivity and the high dynamic range are wanted.

FIG. 1 shows a micro-channel plate (MCP) detector system 10 for a mass spectrometer. A micro channel plate multiplier 12, 14 consists of a large number of individual electron multiplier channels positioned in parallel typically in the shape of a perforated thin dish. Such a detector system typically comprises two MCP electron multipliers 12, 14, each having a gain of approximately 1000. This means that the first MCP 12 converts the incident ion 18 to a number of secondary electrons, which are then further multiplied to give of the order of 1000 electrons at the exit of this first detector. These 1000 electrons are transported to the second MCP 14 situated of the order of millimeters away. The 1000 electrons will impinge on the surface of the second MCP 14, and a new multiplication process with an amplification of approximately 1000 takes place.

The amplification of the MCP will be temporary degraded (or lost) if too many secondary electrons are drawn from the output of a channel. The degraded gain results in lowered signal-to-noise ratio in the recorded spectrum when using analog-to-digital conversion (ADC) or a dead time after a large peak when using time-to-digital conversion (TDC). Temporary degradation of the gain occurs under two circumstances, either when the gain is high (which is needed for high sensitivity) or when too many ions reaches the MCP within a short period of time (which may be the case for certain ion species in high dynamic range mode).

Therefore it is obvious that trying to detect a sample with large variations of protein concentrations will give rise to just these conditions. In the high gain mode, the rare proteins will be lost since they drown in the highly attenuated signal from the abundant proteins. In the low gain mode, the signal from the rare proteins will be lost since it is too close to the dark current (signal with ion beam turned off) of the MCP.

Hence, there is needed a method that combines the best sides of the low gain and the high gain mode of operating the MCP detector system. There have been shown several ways to provide detector systems having an extended dynamic range.

A detector of this type which has two modes of operation to extend its dynamic range is disclosed by Kristo and Enke in Rev. Sci. Instrum. 1988 vol 59 (3) pp 438–442. This detector comprises two channel type electron multipliers in series together with an intermediate anode. The intermediate anode was arranged to intercept approximately 90% of the electrons leaving the first multiplier and to allow the remainder to enter the second multiplier. An analogue amplifier was connected to the intermediate anode and a discriminator and pulse counter connected to an electrode disposed to receive electrons leaving the second multiplier. The outputs of the analogue amplifier and the pulse counter were electronically combined. A protection grid was also disposed between the multipliers. At high incident ion fluxes, the output signal comprised the output of the analogue amplifier connected to the intermediate anode. Under these conditions a potential was applied to the protection grid to prevent electrons entering the second multiplier (which might otherwise cause damage to the second multiplier). At low ion fluxes, the potential on the protection grid was turned off and the output signal comprised the output of the pulse counter. In this mode the detector was operable in a low sensitivity analogue mode using the intermediate anode and a high sensitivity ion counting mode using both multipliers and the pulse counter, so that the dynamic range was considerably wider than a conventional detector which only use one of these modes. The switching between the two sensitivity levels is in this case performed as a response to the detected signal, i.e. direct feed back.

WO 99/38190 disclose a dual gain detector having two collection electrodes with different areas, whereby the larger electrode is used for detecting at low ion flux and the smaller at high ion flux. In a special embodiment the smaller collection electrode is provided as a grid that is placed between the first and the second MCP.

Soviet Inventors Certificate SU 851549 teaches the disposition of a control grid between two micro channel plate electron multipliers, the potential of which can be adjusted to control the gain of the assembly. This detector is further incorporated in a direct feed back detection system.

However, none of these detector systems represent a system that has the ability to cover the complete ion flux spectra of the proteins in a cell with high accuracy. More specifically, Kristo et al only detects approx. 10% of the ions at low ion fluxes, and both this system and the system disclosed in WO 99/38190 represent static two level systems, which results in lower over all sensitivity.

SUMMARY OF THE INVENTION

Obviously an improved detector system is needed, which provides detection over an improved dynamic range, such that analysis of samples with large variations of protein concentrations, e.g. a cell, may be performed with a mass spectrometer.

The object of the present invention therefore is to provide a new high sensitivity detector system and a method of controlling the same, which overcome the limitations with the prior art devices. This is achieved by the detector system of claim 5 by the method as defined in claim 1 and by the detector of claim 3.

An advantage with the detector system according to the invention is that a new detector system with fast variable gain and a method of operating the same are achieved.

Embodiments of the invention are defined in the dependent claims.

DETAILED DESCRIPTION OF THE INVENTION

Embodiments of the invention will now be described with reference to the figures.

Figure 1:
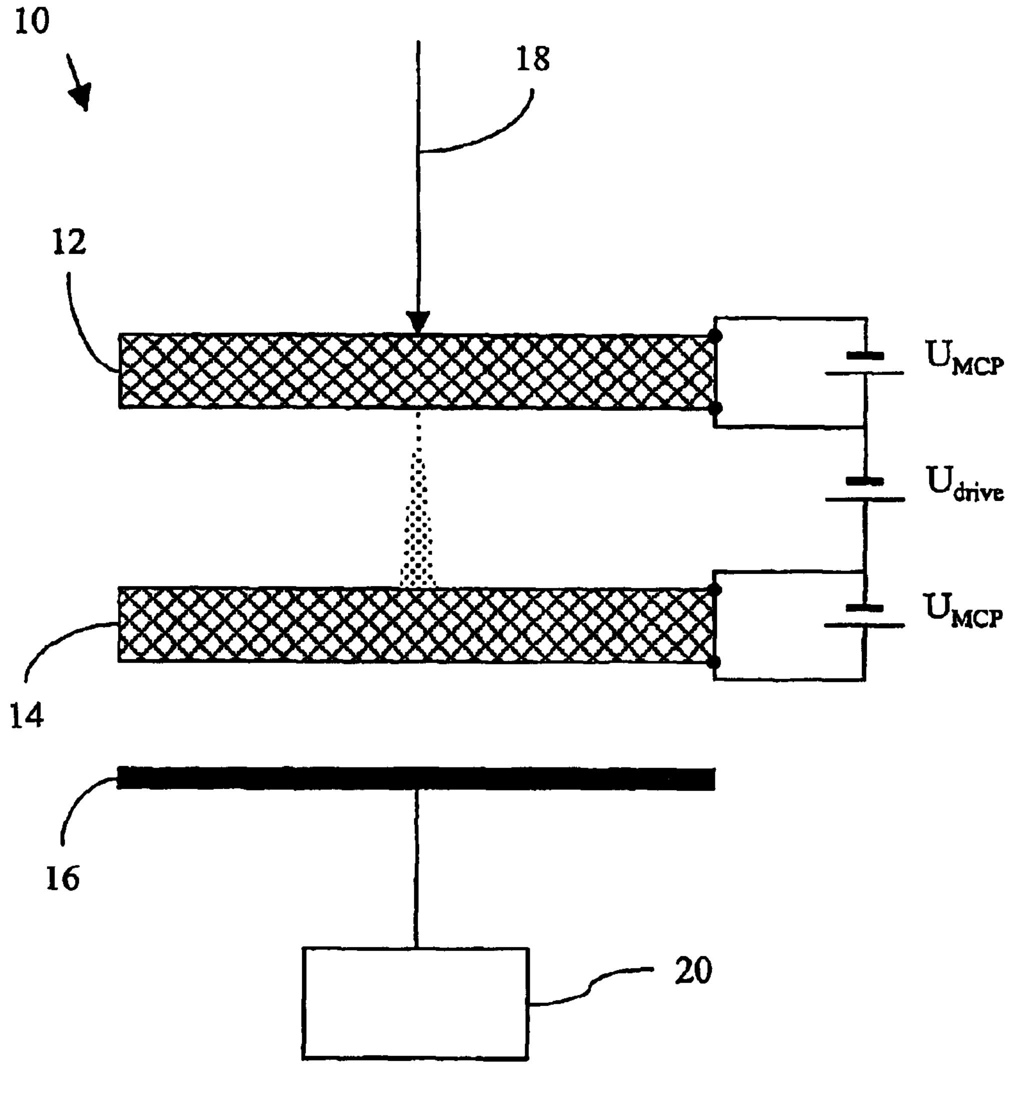
FIG. 1 shows an example of a conventional MCP detector system.
Figure 2:
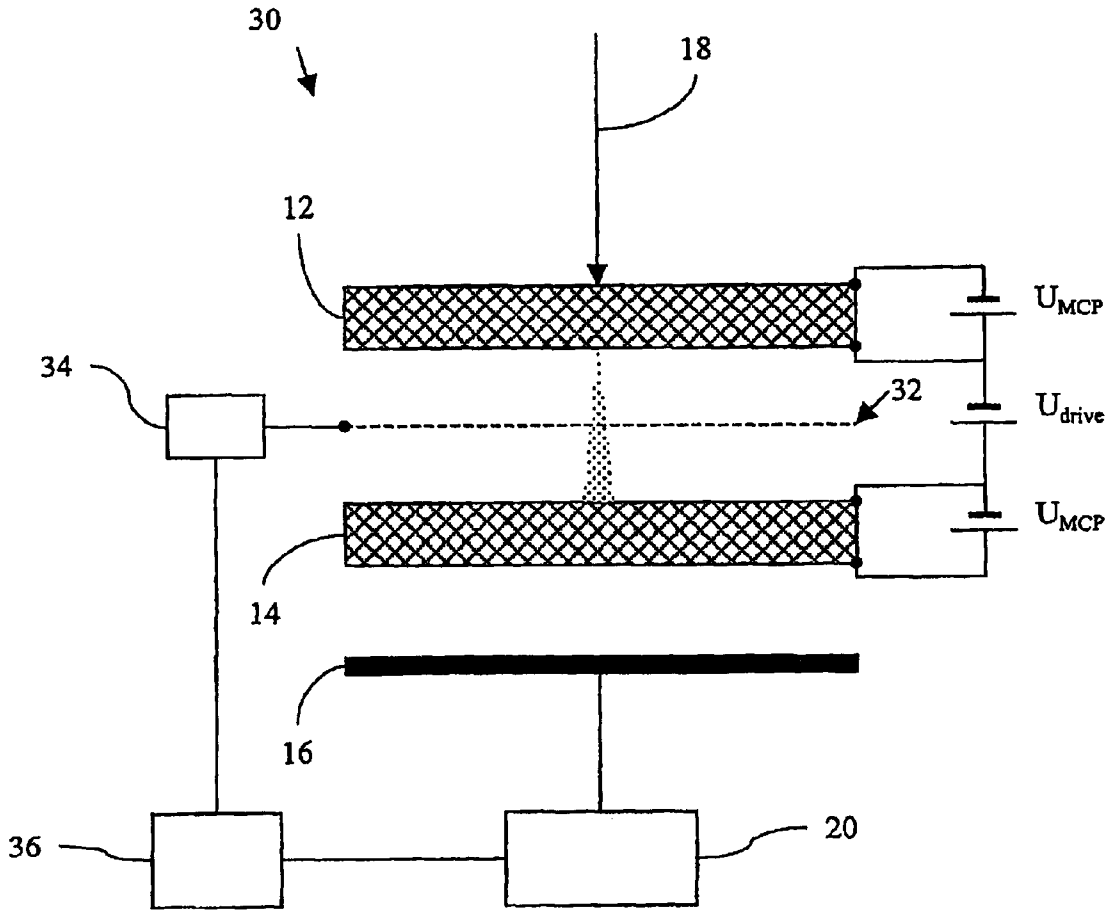
FIG. 2 shows a fast switching MCP detector system according to the invention.

FIG. 2 shows the detector system 30 according to the invention, which is comprised of a modified MCP detector which will be described in detail below, a data acquisition unit 20, a data storage unit 36 and a gain control unit 34. The data acquisition 20 unit is connected to the detector anode 16 and provides spectrum data to the data storage unit 36 and/or to an external data processing unit for processing and presentation of acquired spectra The gain control unit 34 is arranged to control the gain of the detector during the acquisition of a spectra in accordance with a control spectra stored in the data storage unit 36, which control spectra may resemble a previous recorded pilot spectra or another predefined spectra.

The basic idea behind the invention is to lower the detector gain by lowering the transmission to the second MCP 14 when abundant protein ions appear. This change of overall gain has to be performed during the arrival time of the ion (mass spectral peak width), that is, at a time scale of about 10 ns for time-of-flight systems. Due to this extremely short time scale the gain can not be varied by changing the voltage over the MCP 12, 14 in a conventional MCP detector, since the 1GΩ resistance of the MCP 12, 14 will make the electric-field drop over the MCP channels a timely event.

Instead, as shown in FIG. 2, a modified MCP detector is proposed. The modified MCP detector will hereafter be referred to as a fast variable gain MCP detector, and just like a conventional MCP detector it comprises a first and a second MCP 12, 14, and an anode 16 for collecting the output electrons from the second MCP 14. A fast variable gain MCP detector may then be achieved by disposing a gate electrode 32 between the first and the second MCP 12, 14. The gate electrode 32, which could be a high transmission conductive mesh, may provide a retarding field to the output electrons from the first MCP 12. The retarding field then causes the electrons with low energy to be retarded and turned back, while the high-energy part of the output electron energy distribution passes through the gate electrode, whereby a lowere-electron current reaches the second MCP 14. The anode 16 collects the output electrons from the second MCP 14, and due to the retarding potential at the gate electrode 32 the output signal from the anode 16 is lowered. The working principals of the detector will now be similar to the operation principle of the predecessor to the transistor, the triode electron tube. In this analogy, the first MCP 12 acts as the cathode, the gate 32 as the grid, and the second MCP 14 and anode 16 as the anode of the electron tube.

In the MCP detection system according to the invention, the gain control unit 34 is connected to the gate electrode 32, whereby it may control the gain of the fast variable gain MCP detector by applying an appropriate retarding potential on the gate electrode 32. As mentioned above the gain control unit 34 receives control information data from the data storage unit 36.

Figure 3A:
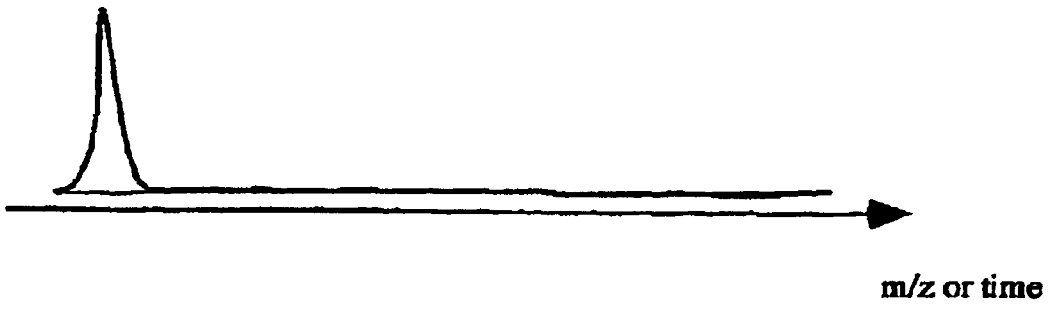
FIGS. 3*a*–3*c* show examples of recorded spectra at different steps of the method according to the invention.
Figure 3B:
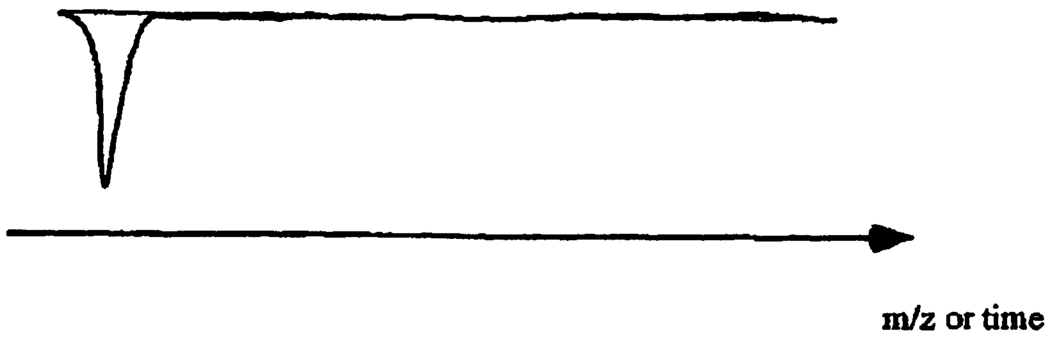
Figure 3C:
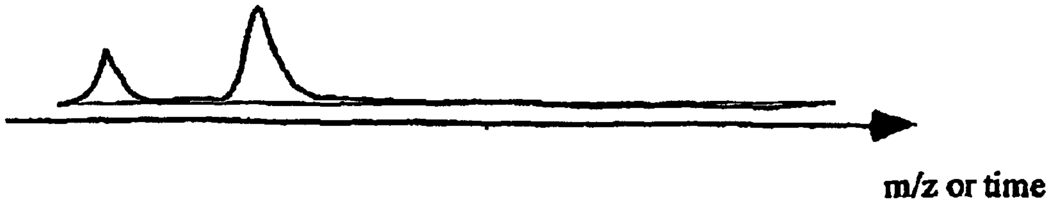
Figure 4:
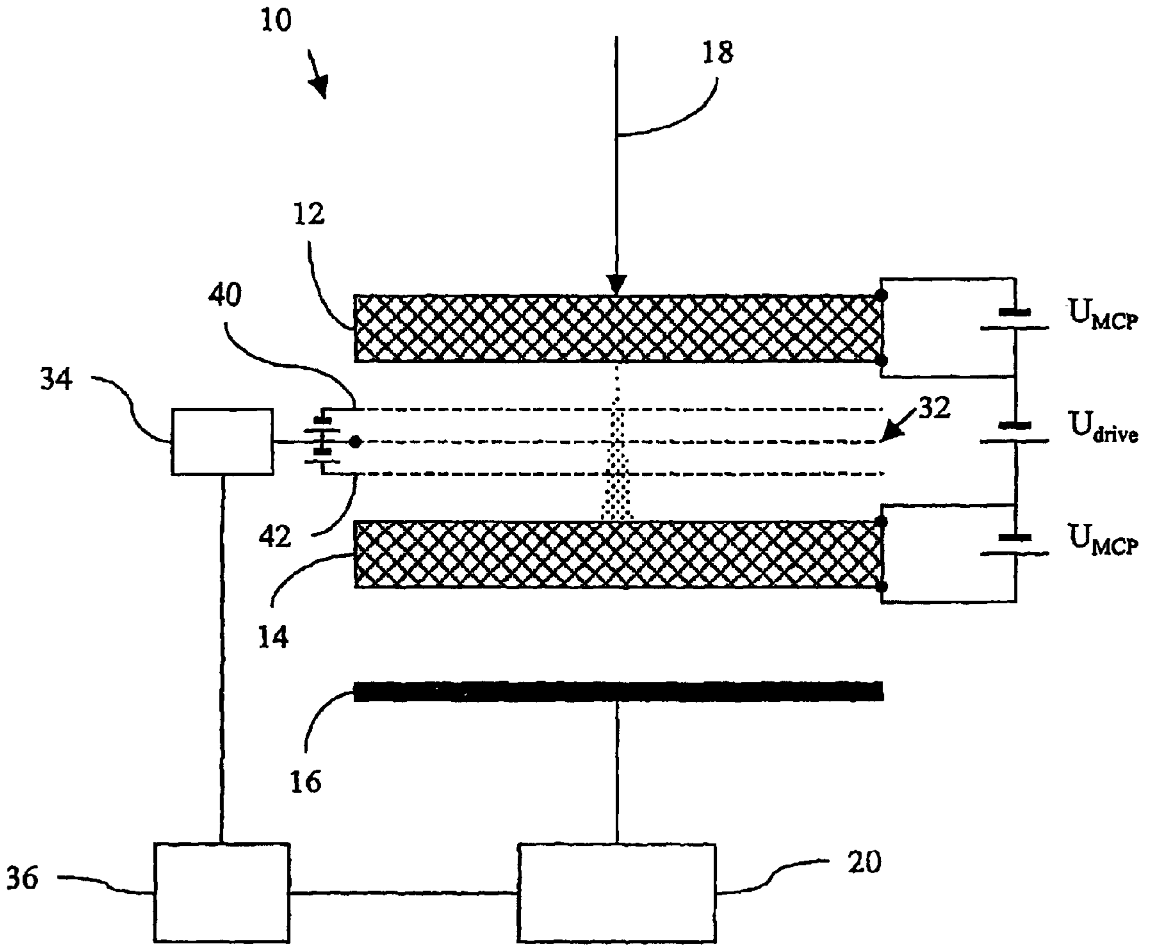
FIG. 4 shows a fast switching MCP detector according to one embodiment of the invention.

To know when to lower the gain for a certain sample a first "pilot" spectrum is recorded for the sample by performing a measurement with a constant potential on the gate electrode 32. The recorded pilot spectrum is thereafter stored in the data storage unit 36. An example of such a pilot spectrum is shown in FIG. 3*a*, and examples of spectra that are obtained in later steps of the method is shown in FIGS. 3*b* and 3*c*. In some cases the pilot spectrum may advantageously be recorded with a potential on the gate electrode 32 that varies according to a predetermined function.

During the following measurement cycle(s) the gain control unit 34 receives the pilot spectrum from the data storage unit 36, and in response to this spectrum it applies a retarding potential as a function of m/z or time on the gate electrode 32 (FIG. 3*b*). Whereby, the recorded spectrum from the following measurement cycle(s) is, so to say, modulated with the stored pilot spectrum, and faint peaks may appear. As can be seen in FIG. 3*c*, this process causes the second peak to appear, which peak was highly discriminated in the first spectrum (FIG. 3*a*), and the initially high peak in the pilot spectrum is lowered due to the lower gain at this m/z.

To further improve the accuracy, several spectra may be summed up to obtain a better signal-to-noise (S/N) ratio, and this summed spectrum may then be used as a new pilot spectrum. Where after this process is repeated until the sample is consumed, or enough information is gathered.

In cases when a well-known sample is to be analyzed, and when only a small sample volume is available, a predefined pilot spectrum may be used, and the recording of a pilot spectrum may be omitted. In this way, pilot spectra only have to be recorded when an unknown sample is to be analyzed.

In an alternative embodiment of the fast variable gain MCP detector, a shielding electrode 40 may be displaced between the first MCP 12 and the gate electrode 32 to shield the retarding potential on the gate electrode 32 and give shorter response time and peak broadening. Alternatively a second shielding electrode 42 may also be displaced between the gate electrode 32 and the second MCP 14, whereby even better performance is achieved. As the detector in general, as mentioned, is similar to triode electron tubes, alternative embodiments, corresponding to existing electron tube configurations, are to be considered to be within the scope of the present invention.

The first MCP 12 may perform a direct conversion of the incident ions 18 to secondary electrons, or alternatively, a separate conversion dynode surface (not shown) may be introduced into the system prior to the first MCP 12 where the ions impinge and produce secondary electrons for further transport to the first MCP 12. In this second version, the gate electrode 32 may be introduced either between the first and second MCP 12, 14, or between the conversion dynode and the first MCP 12. Extra electrodes may be introduced for acceleration of the electrons and for shielding of electrical fields.

It is also conceivable, to allow better detection of rare ions, to gradually increase the voltage over the MCP ($U_{MCP}$) between spectra, thus enhancing the non-gated gain of the MCP. To make this effective, it is essential to modulate the gate potential within each spectrum to discriminate the abundant ions.

It would be possible to use both ADC and TDC techniques, using ADC for high abundance ions and TDC for the lowest abundance ions. The ADC can be used to mimic a TDC using fast data processing between each spectrum. It will be advantageous to use a variable discriminator circuit or bias threshold for the TDC/ADC techniques, so that the discriminator or bias threshold levels can be varied between spectra.

What is claimed is:

1. A method of acquiring a wide dynamic range spectrum using a fast switching micro-channel plate (MCP) detector including a gate electrode (32) disposed between a first and a second MCP electron multiplier (12, 14), comprising the step of:

applying, in response to a pilot spectrum, a retarding potential as a function of m/z or time on the gate electrode (32), such that the transmission of electrons from the first MCP (12) to the second MCP electron multiplier (14) is lowered when abundant protein ions appear and neighboring peaks from rare protein ions may be detectable.

2. The method of claim 1, wherein the pilot spectrum is achieved by the steps:

acquiring a first spectrum with the potential on the gate electrode (32) set to a constant value or set to follow a predetermined function throughout the measurement cycle, and saving the first acquired spectra as the pilot spectra.

3. A fast switching micro-channel plate (MCP) detector comprising a first and a second MCP electron multiplier (12, 14), an anode (16), and a gate electrode (32) that is disposed between the first and the second MCP electron multiplier (12, 14), wherein a shielding electrode (40) is displaced between the first MCP electron multiplier (12) and the gate electrode (32) to shield the retarding potential on the gate electrode (32).

4. The MCP detector of claim 3, wherein a second shielding electrode (42) is displaced between the gate electrode (32) and the second MCP electron multiplier (14) to further shield the retarding potential on the gate electrode (32).

5. A micro-channel plate (MCP) detector system (10) comprising a MCP detector, a data acquisition unit (20), wherein the detector comprises a first and a second MCP electron multiplier (12, 14), one or more anodes (16) connected to the data acquisition unit (20) and a gate electrode (32) disposed between the first and the second MCP electron multiplier (12, 14), wherein the detector system further comprises a data storage unit (36) and a gain control unit (34) which is connected to the gate electrode (32) and to the data storage unit (36), a pilot spectrum is stored in the data storage unit (36), and the gain control unit (34) is arranged to read the pilot spectrum from the data storage unit (36), and to control the potential on the gate electrode (32) as a function of m/z or time in response to said pilot spectrum, such that the transmission of electrons to the second MCP electron multiplier (14) is lowered at the time that it is expected that abundant protein ions will appear, whereby a high sensitivity is maintained during the remainder of the measurement cycle such that neighboring peaks from rare protein ions become detectable.

6. The mass-spectrometer of claim 5, further comprising a micro-channel plate (MCP) detector system (10).

* * * * *